United States Patent
Specht et al.

(10) Patent No.: US 6,178,846 B1
(45) Date of Patent: *Jan. 30, 2001

(54) DEVICE FOR SEPARATING A PEDAL MOUNTING FROM THE STRUCTURE OF A MOTOR VEHICLE

(75) Inventors: Martin Specht, Feldafing; Rainer Schröter; Walter Krauss, both of München, all of (DE)

(73) Assignee: Volkswagen AG, Wolfsburg (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/011,373

(22) PCT Filed: Jul. 12, 1996

(86) PCT No.: PCT/EP96/03069

§ 371 Date: Sep. 28, 1998

§ 102(e) Date: Sep. 28, 1998

(87) PCT Pub. No.: WO97/06036

PCT Pub. Date: Feb. 20, 1997

(30) Foreign Application Priority Data

Aug. 9, 1995 (DE) ............................ 195 29 347

(51) Int. Cl.$^7$ ................................... G05G 1/14
(52) U.S. Cl. ........................ 74/512; 74/513; 180/274; 180/275
(58) Field of Search ............ 74/512, 513, 560, 74/522, 561, 562; 180/274, 275

(56) References Cited

U.S. PATENT DOCUMENTS

| | | | |
|---|---|---|---|
| 4,297,550 | 10/1981 | Leighton | 200/61.89 |
| 4,779,480 * | 10/1988 | Stocker | 74/513 |
| 4,946,195 | 8/1990 | Ioka et al. | |
| 5,169,172 | 12/1992 | Dolla | |
| 5,211,072 * | 5/1993 | Barlas et al. | 74/512 |
| 5,239,891 * | 8/1993 | Stocker | 74/513 |
| 5,327,797 * | 7/1994 | Seifrit | 74/512 |
| 5,460,061 * | 10/1995 | Redding et al. | 74/560 X |
| 5,531,135 | 7/1996 | Dolla | 74/512 |
| 5,563,355 * | 10/1996 | Pluta et al. | 74/512 X |
| 5,615,749 * | 4/1997 | Kato | 180/274 |
| 6,006,626 * | 1/2000 | Notake et al. | 74/512 |

FOREIGN PATENT DOCUMENTS

| | | | |
|---|---|---|---|
| 2516659 * | 10/1975 | (DE) | 74/512 |
| 3533420 | 3/1987 | (DE) . | |
| 3904616 | 8/1989 | (DE) . | |
| 4335511 | 10/1992 | (DE) . | |
| 4200360 | 7/1993 | (DE) . | |
| 4305290 | 9/1993 | (DE) . | |
| 4340633 | 6/1994 | (DE) . | |
| 4305049 | 8/1994 | (DE) . | |
| 4409235 | 10/1994 | (DE) . | |
| 4409285 | 10/1994 | (DE) . | |
| 4409324 | 10/1994 | (DE) . | |
| 0659615 | 6/1995 | (EP) . | |
| 2031814 | 4/1980 | (GB) . | |
| 56-163973 * | 12/1981 | (JP) | 74/560 |
| 6-211115 * | 12/1981 | (JP) | 74/560 |
| 5-170065 * | 7/1993 | (JP) | 74/512 |
| 9622903 | 8/1996 | (WO) . | |

* cited by examiner

*Primary Examiner*—Vinh T. Luong
(74) *Attorney, Agent, or Firm*—Baker Botts L.L.P.

(57) ABSTRACT

A vehicle for separating a pedal lever (14) pivotable about a spindle (5) from the structure of a motor vehicle, in which the support (21) acting especially as a pressure pipe between the pedal lever (14) and a braking force amplifier (3) has a deformable rod section.

27 Claims, 13 Drawing Sheets

DEVICE FOR SEPARATING A PEDAL MOUNTING FROM THE STRUCTURE OF A MOTOR VEHICLE

BACKGROUND OF THE INVENTION

The invention concerns a device for detaching a pedal mounting which can be pivoted around a spindle (pedal spindle) from the structure of a motor vehicle, with the pedal lever being mounted on the vehicle structure via the pedal spindle and a supporting element being connected to a vehicle component in such a manner that the pedal lever can be pivoted around the pedal spindle with a specified actuating force.

In order to prevent injury to the passengers as a result of sliding of the pedal unit into the interior of the vehicle in the case of an accident, particularly a rear-end collision, a known method is to detach the mounting of one or more of the pedals so that the risk of injuries is reduced.

The object of the invention is to provide a device of the type mentioned above in which it is possible to detach at least one of the pedals from the vehicle structure without requiring a complex design.

SUMMARY OF THE INVENTION

The invention achieves this object in that the supporting element can be moved from its supporting position by excessive forces acting on the vehicle from outside.

Specifically, this makes it possible to move the pedal lever with a small degree of force around its bearing in the area of the pedal spindle. The force required for moving the supporting element from its supporting position may be produced from various sources. For example, for this purpose, the movement and/or deformation of a component of the vehicle (a vehicle component such as the front wall) which separates the interior of the vehicle from the engine compartment caused by the excessive external force acting on the vehicle can be utilized and transferred to the supporting element. Moreover, a mechanically or pyrotechnically-acting energy-storing device which is triggered by the excessive external force acting on the vehicle can provide the required kinetic energy to move the supporting element from its supporting position.

Preferably, the movement of the supporting element from its supporting position takes place against a force which holds the supporting element in its supporting position.

In a practical example of the invention, the pedal spindle may be supported by a pedal spindle bearing, which in turn is supported by a supporting element on a vehicle component which can be moved with respect to the vehicle structure when acted upon by an excessive external force, with the supporting element being moveable when the component moves from its supporting position as a pedal spindle bearing in order to release the mounting of the pedal spindle.

In this case, the moveable arrangement of a vehicle component, i.e., a component supported by springs, is utilized so that the movement of this component with respect to the vehicle structure on excessive acceleration or braking is utilized in order to release the pedal, specifically the pedal spindle bearing, from its mounting on the vehicle structure. Preferably, the invention is used to release the mounting of the brake pedal. In this case, one can utilize the fact that the power brake cylinder is attached via springs, specifically cup springs, to the vehicle structure, e.g., the front wall, in the engine compartment. The vehicle component, e.g., the power brake unit, can execute a wobbling/tilting motion when acted upon by external forces. This movement takes place against the force of the springs, specifically the cup springs, by means of which the unit is supported on the vehicle structure.

This movement of the vehicle component is transferred to the supporting element, which is preferably rigidly attached to the vehicle component. The supporting element, specifically in the form of a rod, then moves from its supporting position, thus releasing the mounting of the pedal.

Preferably, the release of the mounting of the pedal takes place along a specified guide segment. Along this guide segment, a frictional force can act on the pedal, specifically the pedal spindle bearing, which can be guided along the guide segment. This reduces the danger of injury if the driver pushes the released pedal in a panic. For this purpose, a stroke groove may be provided for the pedal spindle bearing along which the pedal spindle bearing is guided in a damped manner or while acted upon by a frictional force. At the end of the guide segment or the guide groove, the pedal spindle bearing is completely released.

It is also possible for the pedal spindle bearing to be immediately or suddenly released from its supporting position after the movement of the supporting element.

Release of the pedal, specifically the pedal spindle bearing, may take place by means of a force which supports said release. This force may be produced by an energy-storing device such as a spring. Specifically, a spring which pretensions the pedal spindle bearing against the supporting element is particularly well-suited for this purpose.

Preferably, the guided movement of the pedal spindle bearing or the pedal spindle into the release position should be a pivoting movement around a pivoting axis. In this case, the pedal spindle and the pedal spindle bearing are pivoted around this pivoting axis. At the end of the pivoting movement, complete release of the pedal spindle and the pedal spindle bearing takes place in that the pivoting axis moves out of its bearing on the vehicle structure.

In order to prevent unintentional or improper release of the supporting element from its supporting position, a sensor-activated locking device may be provided which is triggered by the acceleration sensor only if excessive vehicle acceleration or braking occurs.

In another practical example of the invention, the supporting element is a functional component which is already located on the vehicle. For example, this may be an actuating rod with which the operation of the pedal is transferred between the pedal lever and the vehicle component. For example, this may be a connecting rod by means of which the pedal motion is transferred from the brake pedal to the power brake unit.

In order to release the mounting, the supporting element may be completely moved away from its supporting position. However, it is also possible, by deforming the supporting element, to move it away from its supporting position or its supporting function. If the supporting element is in the form of an actuating rod, a deformation component which can be moved perpendicular to the axial direction acts upon it to deform it. The deforming force acting in this case can be produced by means of an energy-storing device triggered by a vehicle-sensitive sensor, specifically, a pyrotechnic energy-storing device, or by deformation or movement of a vehicle component on application of excessive external force to the vehicle, e.g., in the case of an accident.

Moreover, a rod-shaped supporting element, which specifically serves as a connecting rod to transfer the pedal pressure to the power brake unit, may be designed in such a manner that in normal operation, the forces exerted by operating the pedal can be transferred without difficulty, and in the event of excessive external forces acting on the vehicle, specifically in the case of an accident, it is ensured that the mounting of the pedal on the vehicle will be released. For this purpose, the supporting element may have a tube-shaped cross section, at least in its deformable rod area. For this purpose, the supporting element may essentially be formed over its entire length in a tube shape. The tube shape may be easily manufactured in that shaping forces, specifically forces acting from outside in a radial direction toward the inside, act on a tube-shaped blank to form the special shape of the supporting element, which specifically acts as a connecting rod between a brake pedal and a power brake unit. Specifically, these shaping forces may be produced by rotary kneading of the tube-shaped blank, which is the starting material for the hollow connecting rod.

In shaping the supporting element, articulated bearings may be formed on both ends of the supporting element for articulated support of the supporting element on the vehicle component, which is specifically a power brake unit, and on the pedal lever (brake pedal). A possible embodiment is one in which the articulated bearing supported on the pedal lever is in the form of a solid sphere and, for example, is connected to the hollow cross-section of the supporting element by welding.

BRIEF DESCRIPTION OF THE DRAWINGS

The invention will now be explained in greater detail with reference to the practical examples shown in the figures. The figures show the following.

DESCRIPTION OF PREFERRED EMBODIMENTS

Figure 1:
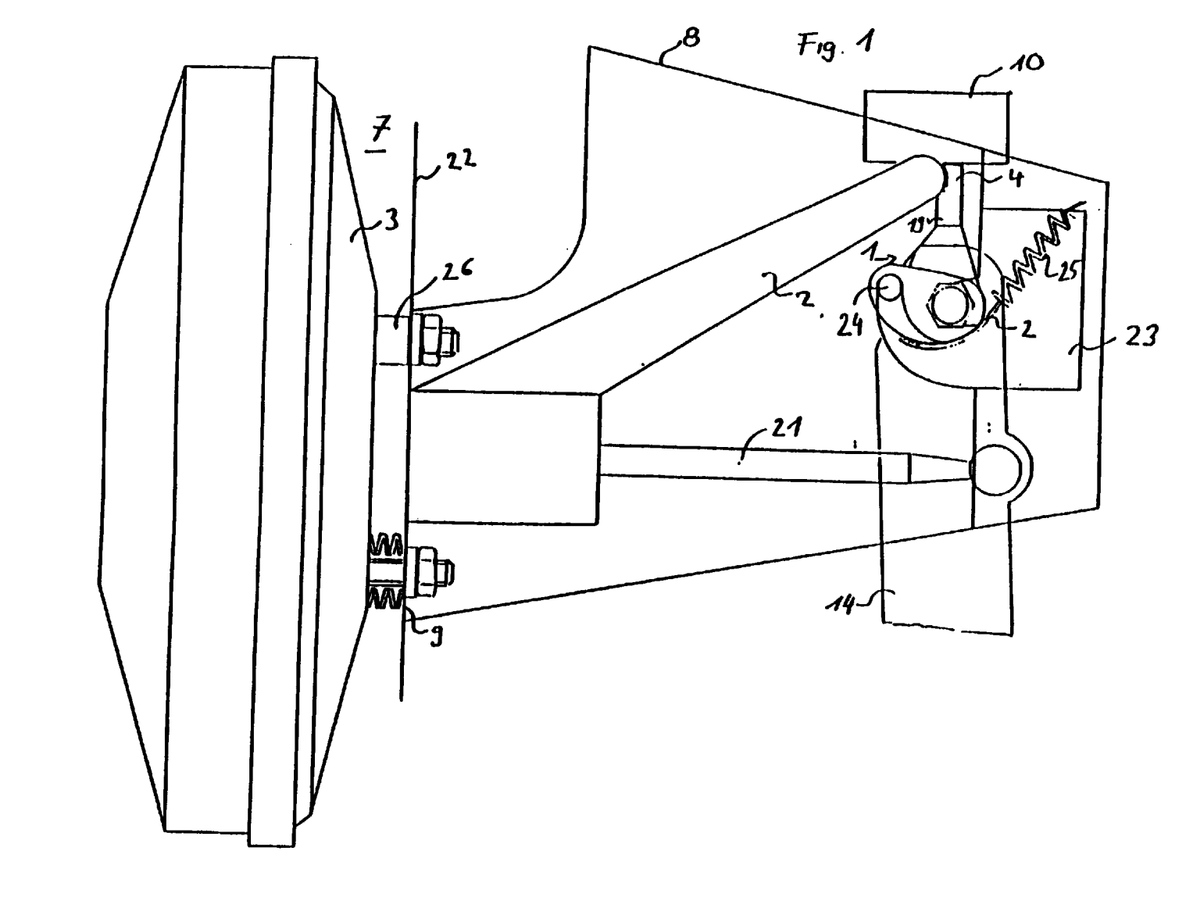
FIG. 1: A side view illustrating a practical example of the invention.
Figure 6:
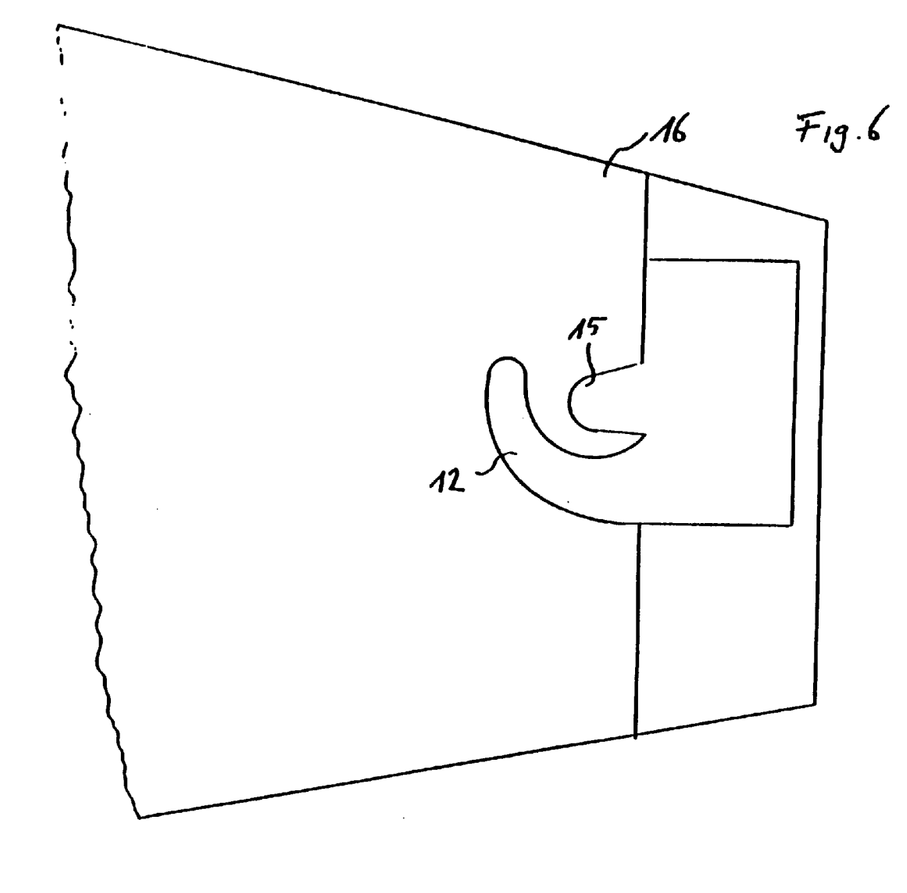
FIG. 6: A side view showing a frame pedal used in the practical example.

The practical example shown in FIGS. 1 through 6 has the basic position shown in FIG. 1 in the case of normal operation of the vehicle. The practical example shows a pedal lever 14 which is supported in a pivoting manner on a pedal spindle 5 via a pedal spindle bearing 1 on the vehicle structure. The pedal spindle 5, which is formed by a bearing pin 17, is placed near the two ends of the bearing pin in first recesses 16 of the vehicle structure 8 (FIG. 6). The recesses 15 are provided in two frame panels 16 (FIG. 2) belonging to the vehicle structure 8, and constitute mounting points for the bearing of the pedal spindle 5. Moreover, the bearing pin 17 forming the pedal spindle 5 is supported in a pivoting manner by two bearing plates 18. The two bearing plates 18 are firmly connected to a stop 4 which is provided on a projecting lever arm 19. The bearing pin 17 is supported in a pivotable manner by the bearing plates 18 which are provided near the two ends of the bearing pin 17. The bearing plates 18 are components of the pedal spindle bearing 1 and are rigidly connected to each other via a connecting stirrup piece 20.

In the two frame panels 16, a second recess 12 curved around the pedal spindle 5 is also provided, which forms a guide groove or guide segment. This recess 12 is closed at one of its ends, and opens at its other end into a third recess 23, into which the first recess 15, which serves as an axial support in the basic position (FIGS. 1 and 2), opens.

In the basic position (FIGS. 1 and 2), a guide element 24 is provided on each bearing plate 18, for example, in the form of a roll body. This guide element rests against the closed end of the second recess 21 in the basic position.

Figure 2:
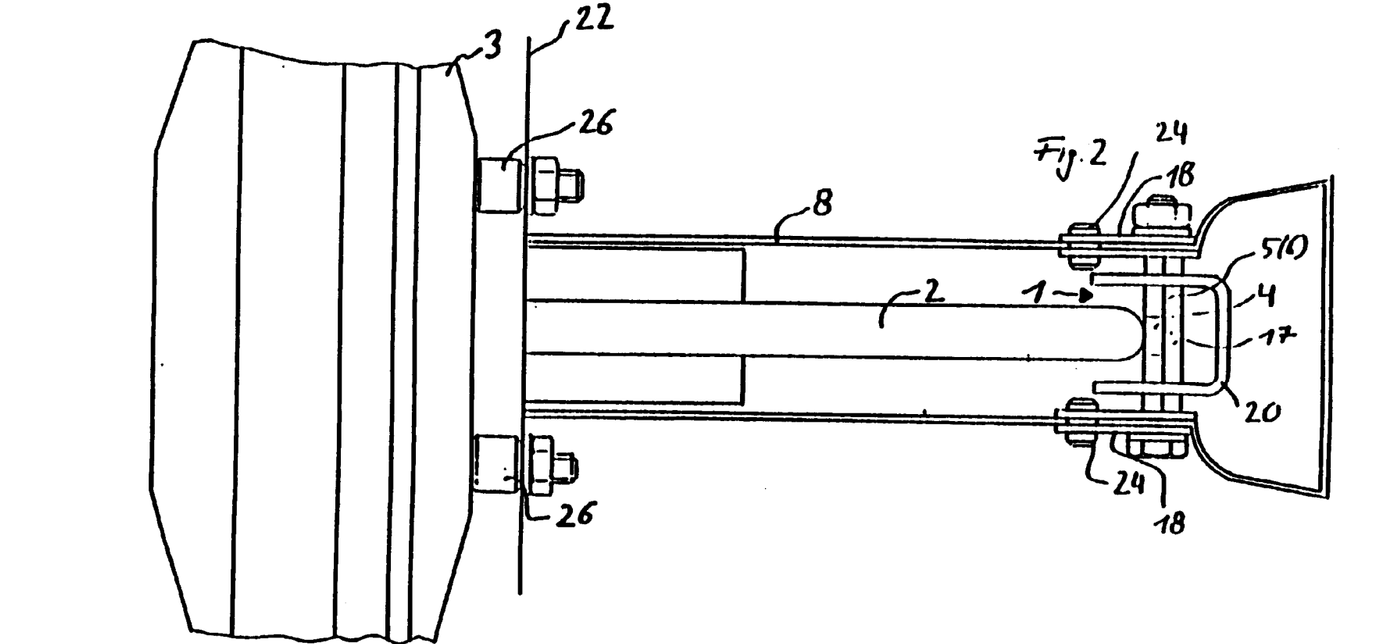
FIG. 2: A top view of the practical example of FIG. 1.

Pretensioning springs 25 engage with the two bearing plates 18. The springs 25 exert a pretensioning force on the two bearing plates 18 or the pedal spindle bearing 1, to which the lever 19 with the accompanying stop 4 belongs. Due to the action of the pretensioning force of the springs 25, the stop 4 rests against a supporting element 2. This supporting element 2, which is in the form of an extension arm, is rigidly connected to a vehicle component 3, which in the practical example shown is a power brake unit. The vehicle component 3 is supported in a tiltable manner via springs 9, specifically cup springs, on the vehicle structure 8 against the force of the springs 9. This tilting motion may take place around attachment sites 26 located at the top.

The pedal movements around the pedal spindle 5 into the vehicle component 3 in the form of a power brake unit are initiated via an actuating rod 21.

In the basic position shown in FIG. 1, the pretensioning force of the springs 25 rigidly supports the pedal spindle bearing 1 against the supporting element 2, which is preferably rigidly connected to the vehicle component 3, in the area of the stop 4. The pretensioning force of the springs 25 acts on the pedal spindle bearing 1 in such a way that torque acts on the pedal spindle bearing 1 with respect to the pedal spindle 5. For this purpose, a connecting piece 27 is provided which extends from the respective pretensioning spring 25 along a curved rope guide up to a respective point of action 28 on the bearing plate 18. Due to the interaction of the function of supporting the pedal spindle bearing 1 exerted by the supporting element 2 and the pretensioning force of the springs 25 acting on the pedal spindle bearing 1, proper mounting of the pedal spindle 5 on the vehicle structure 8 in the first recesses 15 and second recesses 21 of the frame panels 16 is achieved.

Moreover, a locking device 11 supported on the vehicle structure 8 is provided which locks the supporting element 2 against unintentional motion or motion due to improper use. The locking device 11 is triggered only when an acceleration sensor 10 detects excessive vehicle acceleration or braking.

Figure 3:
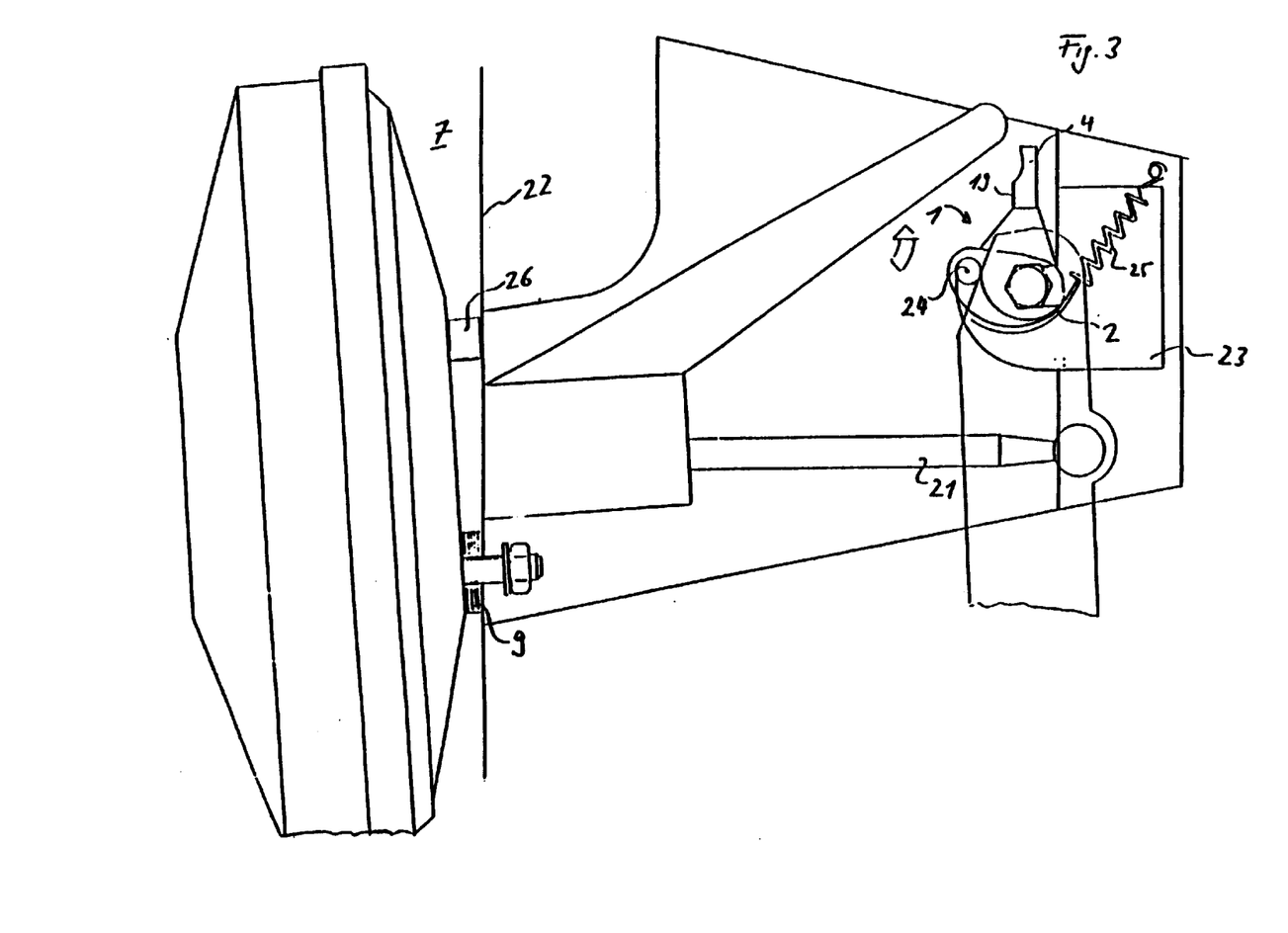
FIG. 3: A side view similar to FIG. 1 showing the example in the operating position after release of the supporting element.

For example, in the case of an accident, when a case of this type occurs, the locking device 11 is released. Moreover, forces act on the vehicle component 3 from outside in such a manner that the spring or springs 9 is/are pressed together and the vehicle component is tilted or pivoted around the upper attachment sites 26. This movement is transferred to the supporting element 2 which, as shown in FIG. 3, is moved away from the stop 4 on the pedal spindle bearing 1. Under the effect of the pretensioning springs 25, the two bearing plates 18 are then pivoted around a pivoting axis 6 of the pedal spindle bearing 1, which, in the practical example shown, coincides with the pedal spindle 5. This pivoting axis 6 may also be provided at another location parallel to the pedal spindle 5 supported on the vehicle component 8.

Figure 4:
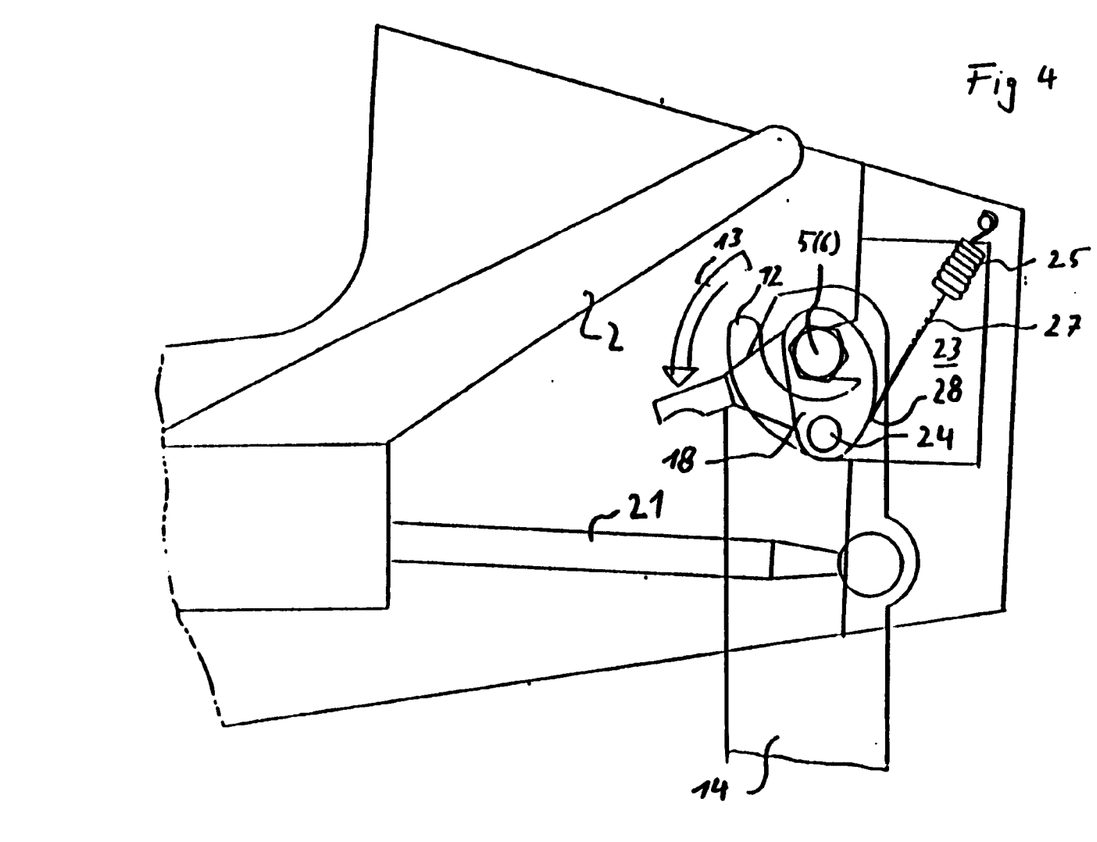
FIG. 4: A side view showing the example in the operating position in which the pedal is moved into its release position.
Figure 5:
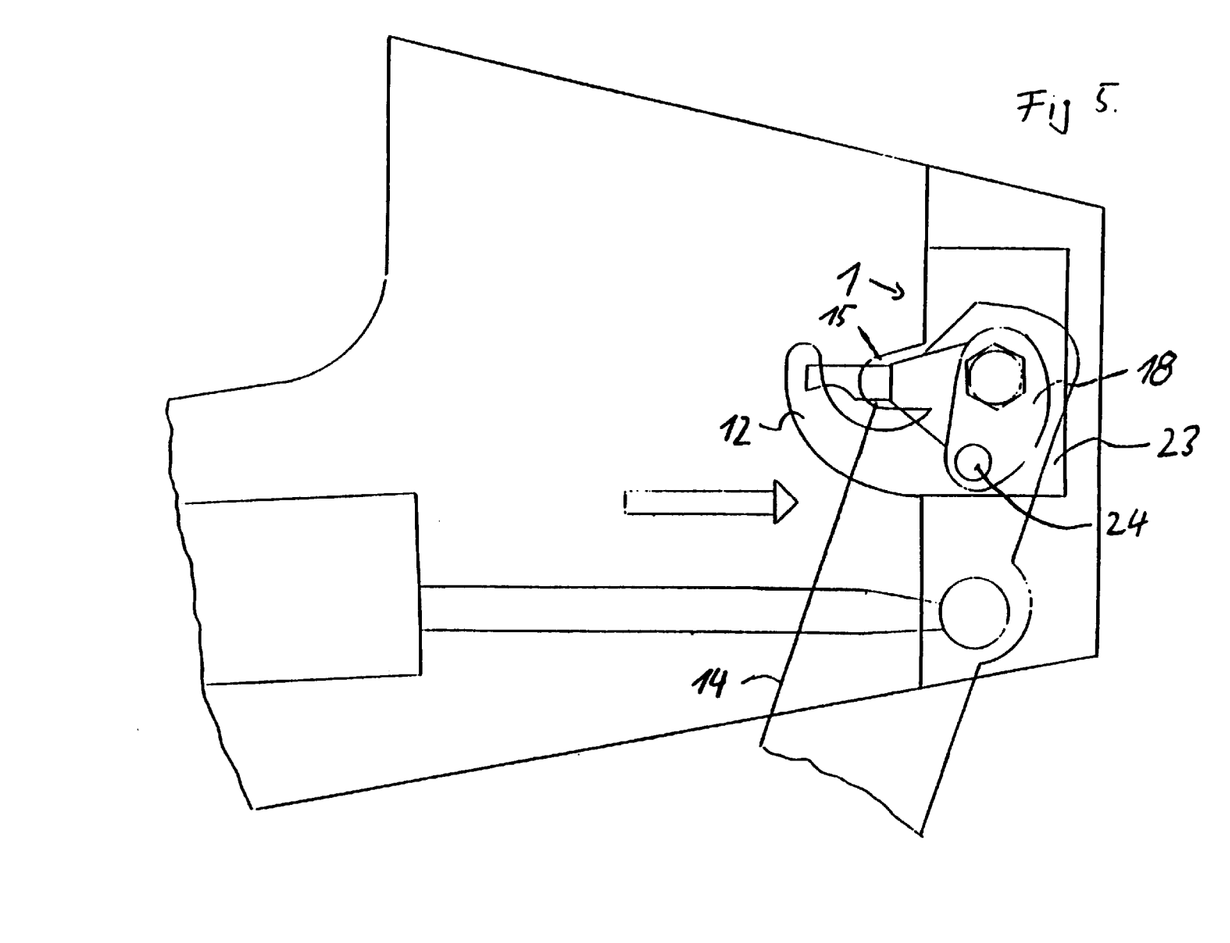
FIG. 5: A side view showing the final release of the mounting of the pedal.

During this pivoting motion, the guide elements 24 are guided along their accompanying second recesses 21. The guide elements 24 may have a frictional and damping action in conjunction with the boundary surfaces of the second recesses 21. In the practical example shown, frictional force pairs are formed in this manner which act between the two pivoted bearing plates 18 and the vehicle structure 8. The bearing plates 18 and the lever arm 19 connected thereto are pivoted, as shown in FIG. 4, in the direction of an arrow 13 around the pivoting axis 6, which, as explained above, is the pedal spindle 5 in the practical example, in a direction toward the open end of the recess 21. In this case, the guide elements move into the third recess 23, into which the open end of the second recess 21 opens.

During the movement of the bearing plates 18 along the guide segment formed by the second recess 21, if the brake pedal is operated in a panicky manner, the danger of injury to the passenger operating the brake pedal is reduced by the damping and/or frictional action of the guide elements 24. The guide elements 24 and the bearing plates 18 move into the enlarged third recess 23, into which the bearing pin 17, which forms the pedal spindle 5, is also moved. This is made possible by the fact that the first recess 15 is opened in the direction of the third recess 23 and the bearing pin 17 is completely detached from its mounting with the frame panels 16 of the vehicle structure 8.

Figure 7:
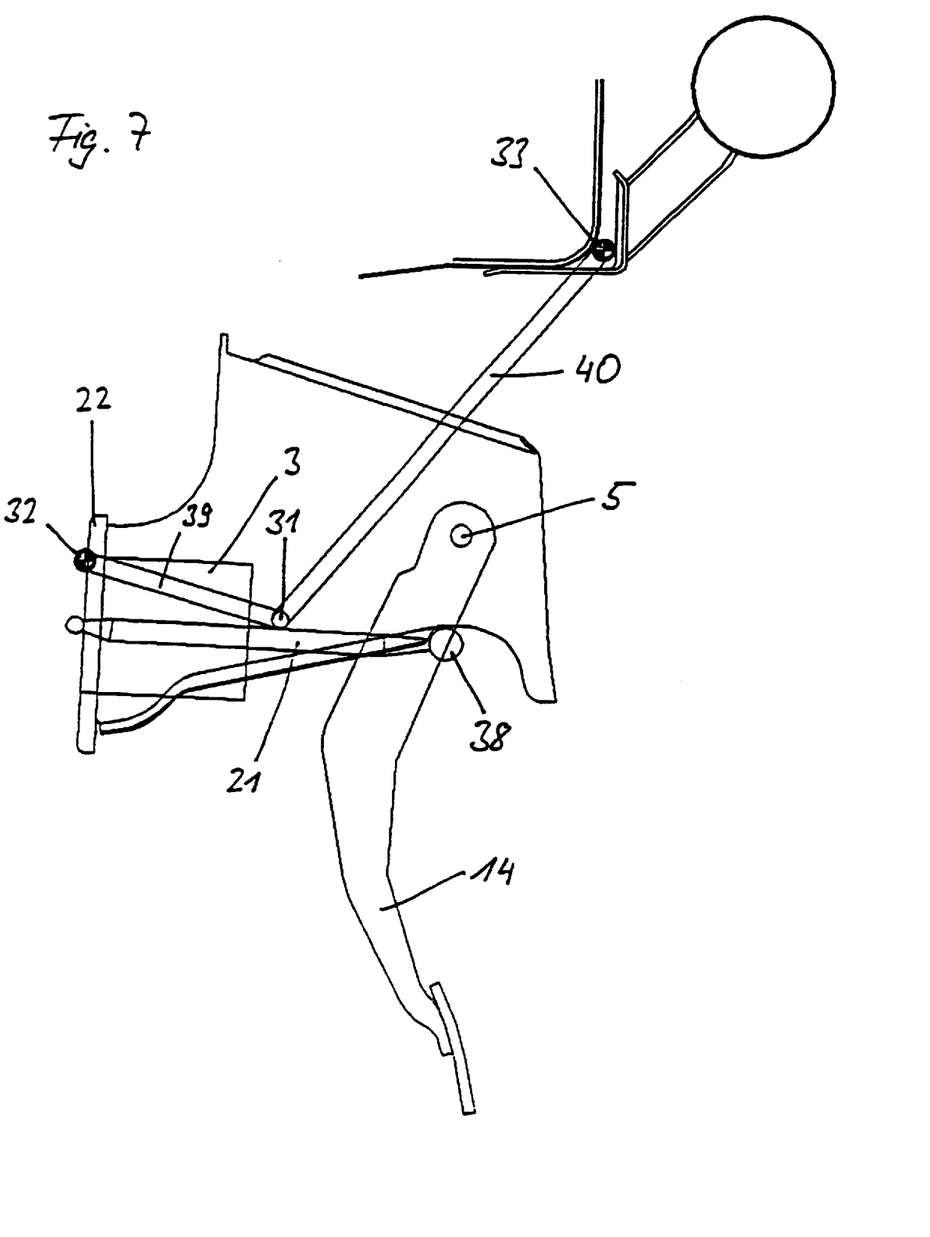
FIG. 7: A schematic side view of a further practical example in the normal position.
Figure 8:
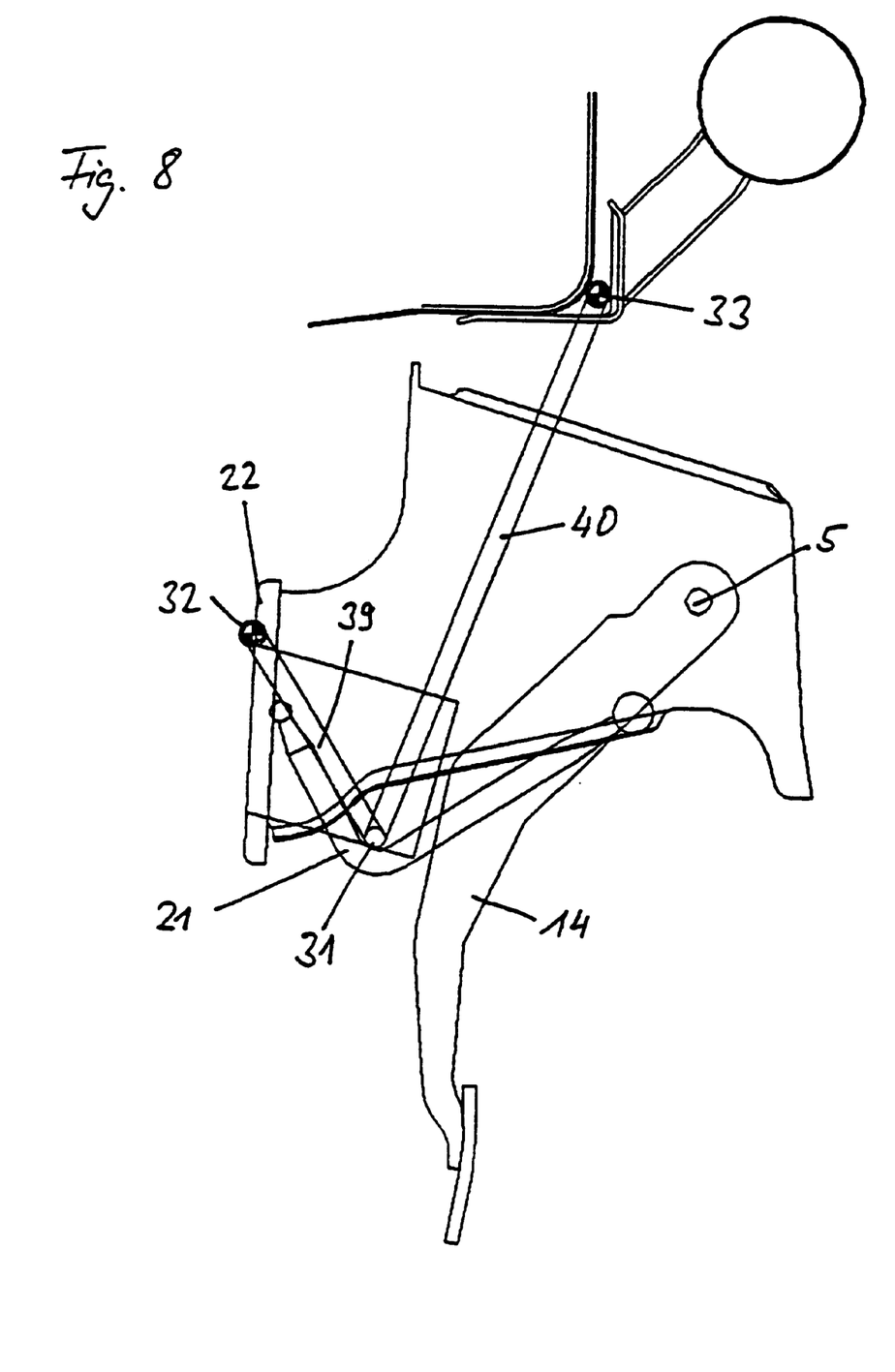
FIG. 8: A side view showing the operating position of the practical example of FIG. 7 after disengagement of the pedal.
Figure 9:
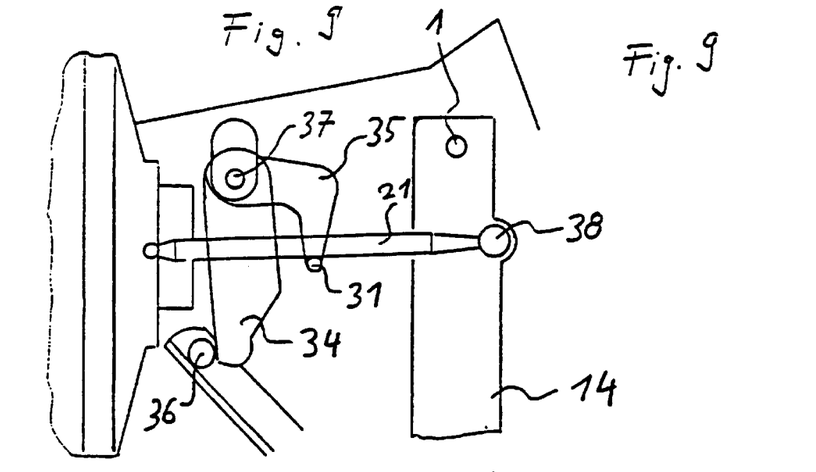
FIG. 9: A side view showing a third practical example in normal operation.
Figure 12:
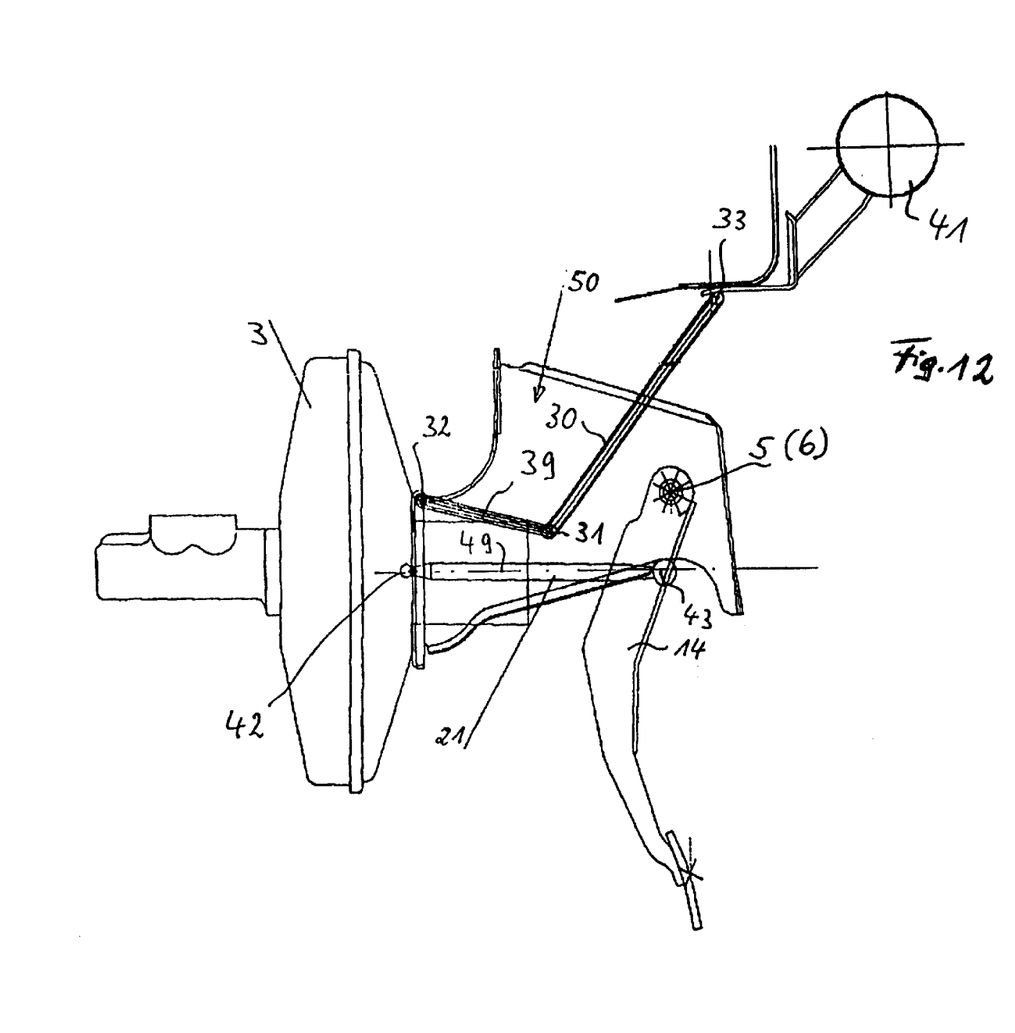
FIG. 12 shows a further practical example in its normal operating position.

In the practical example shown in FIGS. 7 through 14, the supporting element is the actuating rod 21, which operates between the pedal lever 14 and the vehicle component (power brake system) 3 and serves to transfer the pedal motion to the vehicle component 3. In FIGS. 7, 9 and 12 the normal operating position with the supporting element 21 in its supporting position is shown. In this position, the movements of the pedal lever 14 in an axial direction are transferred via the actuating rod 21, which acts as a connecting rod, to the power brake unit which forms the vehicle component 3. In this normal position, the pedal lever 14 is supported on the vehicle structure via the pedal spindle bearing 1 and a supporting site 38 on the vehicle structure. The supporting site 38 forms the articulated connecting site between the pedal lever 14 and the actuating rod 21. The pedal lever 14 is therefore mounted on the vehicle structure in the normal operating position in such a manner that it can be pivoted around the pedal spindle.

In order to detach this mounting, in the two practical examples of FIGS. 7 through 14, means are provided which deform the actuating rod 21, specifically bending it, as shown in FIGS. 8, 10, 13, and 14. For this purpose, there is a respective point of action 31 which, in the event of excessive force applied to the vehicle during an accident, is moved perpendicular to the axial direction of the actuating rod 21 so that the actuating rod is deformed or bent away from its supporting position. In this case, as is specifically shown in FIGS. 8, 10, and 14, the pedal lever 14 is moved from the normal operating position away from the feet of the driver. Moreover, mechanical disengagement from the mounting of the pedal lever 14 shown in FIGS. 7, 9, and 12 may also occur.

The risk of injury on sudden operation of the pedal (panic operation), is also reduced by the fact that after disengagement on operation of the pedal, a certain degree of deformation resistance is still present in the deformed actuating rod 21 (FIGS. 8, 10, and 13), thus preventing the pedal from being pushed completely to the floor without any resistance. Moreover, disengagement of the pedal provides additional free space as the pedal is moved out of the foot area.

Figure 13:
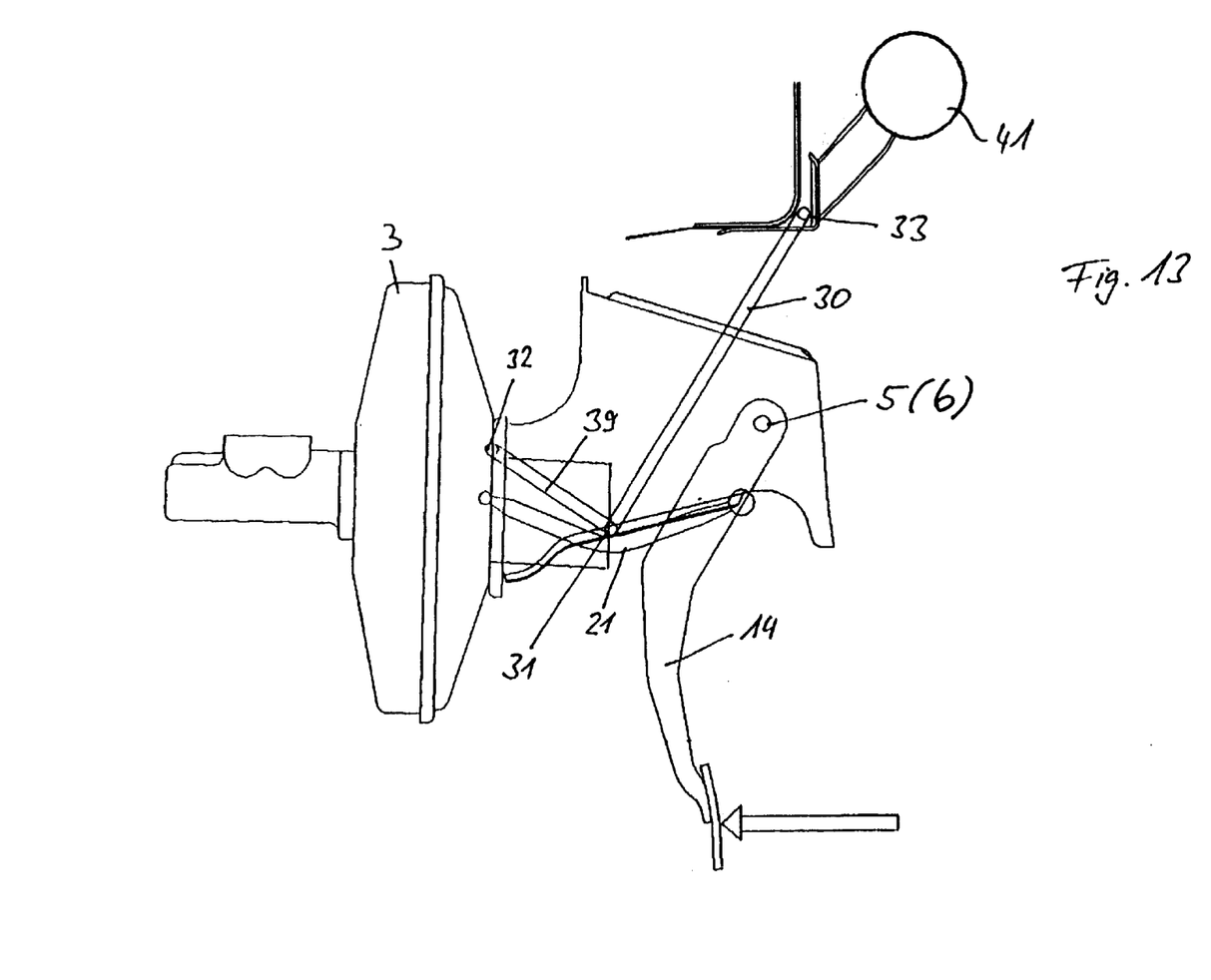
FIG. 13 shows the example of FIG. 12 with the parts in positions to which they are moved during the course of an accident.

In the practical examples shown, the deformation or movement of a vehicle component, specifically the front wall 22, is utilized in order to produce the forces necessary to deform the actuating rod 21. For this purpose, in the practical examples shown in FIGS. 7, 8, and 12 through 14, the point of action 31 is supported via rigid struts 39 and 40 on supporting points 32 and 33 of the vehicle structure. On deformation of the front wall toward the interior of the vehicle, the rigid struts, which are supported on the front wall 22 at supporting point 32 and at the supporting point 33 diagonally above the point of action 31 on the vehicle structure, cause forces to occur whose resultant force acts on the point of action 31 at right angles to the axial direction of the actuating rod 21 in such a manner that the actuating rod 21 is deformed or bent, as shown in FIGS. 8 and 13. In this case, the supporting point 33 remains essentially stationary, while the supporting point 32 provided on the front wall 22 moves inward in the direction of the vehicle interior.

Figure 10:
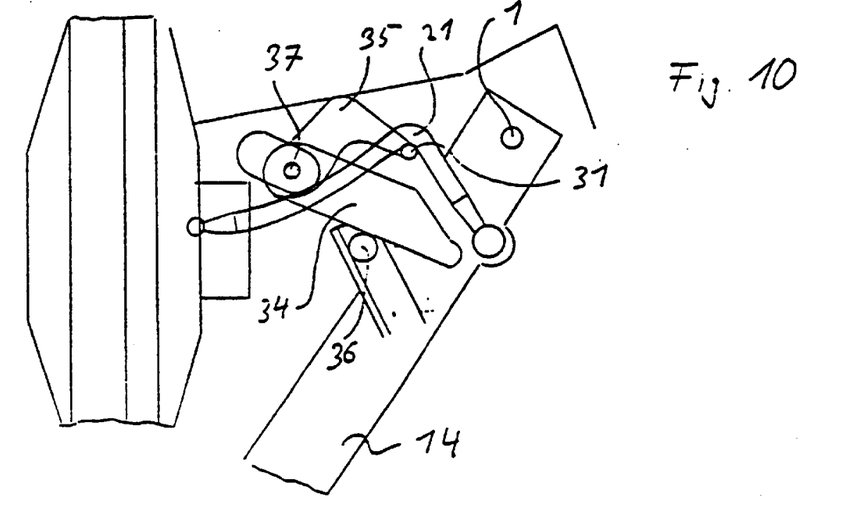
FIG. 10: A side view showing the third practical example with the pedal disengaged.
Figure 11:
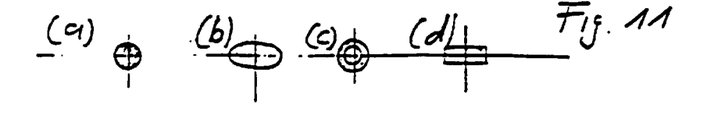
FIGS. 11(a)–11(d): Cross-sectional views showing various shapes of the supporting elements for use in the practical examples in FIGS. 7 through 10.

In the practical example shown in FIGS. 9 and 10, a crank 34 is provided which can be rotated around a crank axis 37. This rotation is caused by a deformation of the front wall or movement of another component of the vehicle. The movement or deformation is transferred via a force- or motion-transfer site 36 to the crank 34. A catch 35 is rigidly connected to the crank 34, said catch having a point of action 31 in the form of a rod which runs transversely. On rotation of the crank 34, the point of action 31 is moved upward so that the actuating rod 21, as shown in FIG. 10, is deformed or bent. In this case as well, the metal lever 14 is disengaged from the mounting, which is present in the normal position shown in FIG. 9.

In order to produce the deforming force which acts at the point of action 31, an energy-storing device, specifically a pyrotechnic energy-storing device, may be provided, which is triggered by a vehicle-sensitive sensor device. Known examples of such energy-storing devices include arrangements for driving a tightener for tightening a safety belt (DE 4,200,360 A1 and 4,305,049 A1). These driving arrangements may act directly at the point of action 31, or indirectly, e.g., via the crank shown in the practical examples of FIGS. 9 and 10.

FIGS. 11(a)–11(d) show various shapes for the actuating rod. In FIG. 11(a), a round shape is shown, and in FIG. 11(b), an elliptical shape is shown. Preferably, in the case of this shape, as seen in FIG. 11(b), the point of action 31 acts from above or from below as shown in FIGS. 7 through 10 on the actuating rod 21. In FIG. 11(c), a tube-shaped design is shown, and in FIG. 11(d), a rectangular shape is shown. In this case as well, the point of action 31 is provided on the actuating rod 21 from above or from below.

Figure 14:
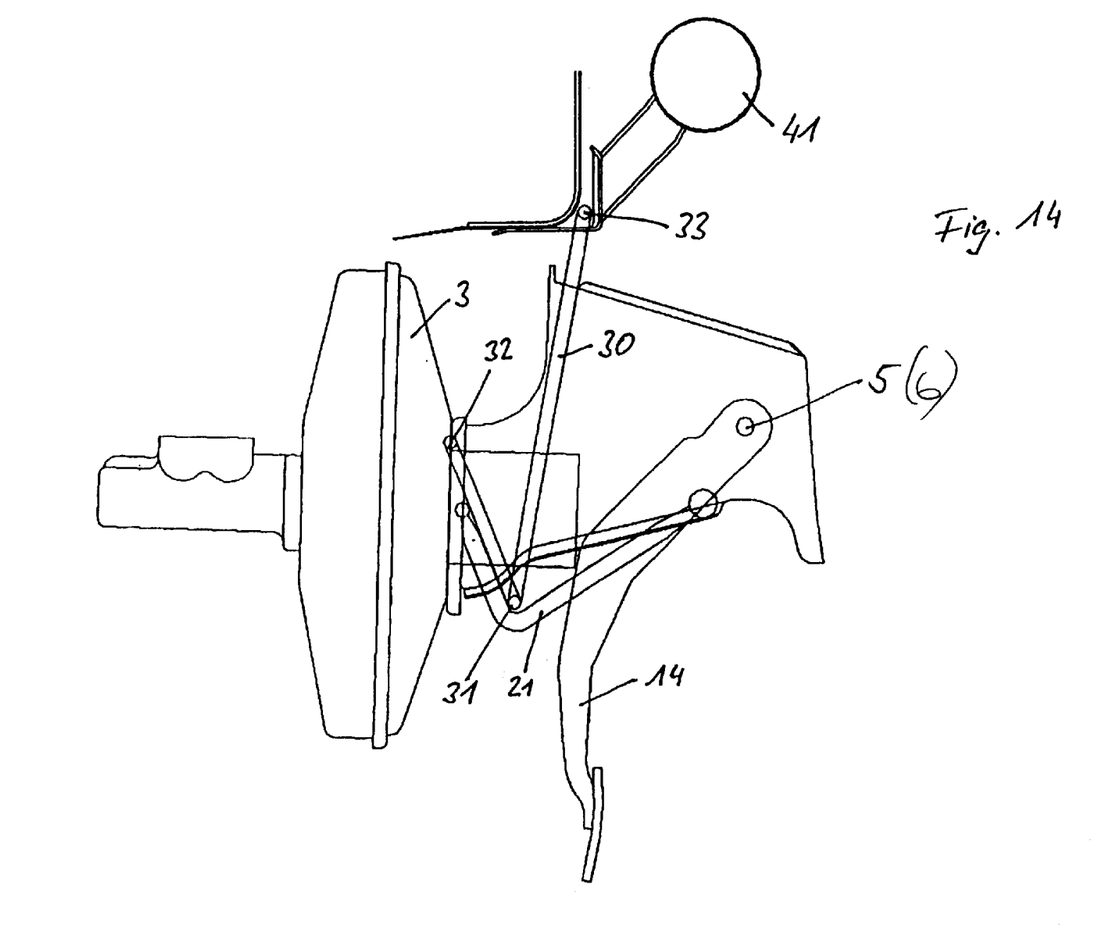
FIG. 14 shows the example of FIG. 12 with the parts in positions to which they are located after an accident.

FIGS. 12 through 14 show an embodiment of the practical example shown in FIGS. 7 and 8. In this embodiment, in the area of a transverse steering tube, a rigid articulated support (30) is attached in a pivoting manner at the supporting point 33 on the vehicle structure. At the lower end of the articulated support 30, there is a point of action 31 which is guided in a restricted manner by the strut 39. The strut is attached in a pivoting manner in the area of the power brake unit 3 on the front wall 22 at the supporting point 32. On movement of the power brake unit or the front wall opposite to the direction of travel, i.e., in a direction toward the interior of the vehicle, restricted guiding of the articulated support 30 and the point of action 31 through the rigid strut 39 takes place. In this case, the point of action 31 moves upward, essentially at right angles to the axial direction of the actuating rod 21, causing it to be deformed, as can be seen in FIGS. 13 and 14.

In the practical examples of FIGS. 7 through 14, specifically those of FIGS. 7, 8, and 12 through 14, by appropriate arrangement of the strut 39 and the articulated support 30, and thus the point of action 31 with respect to the actuating rod 21, one can obtain a specified pedal counterforce on deformation of the actuating rod 21. By means of this pedal counterforce, the kinetic energy of the braking foot on deflection of the brake pedal, specifically during panic braking, can be reduced by the deformation of the actuating rod 21. In this way, one can avoid high contact speeds between the sloping part of the foot and heel of the foot operating the pedal. In this manner, one achieves a definite reduction in pedal force. In normal operation, the point of action 31 is disengaged from the foot pedal, as shown in FIG. 12.

In the embodiments shown in FIGS. 7, 8, and 12 through 14, the relative movement of the pedal with respect to a component of the vehicle which remains stationary, specifically the transverse steering tube 41, is utilized in order to deform the actuating rod 21 and disengage it from the pedal.

Figure 15:
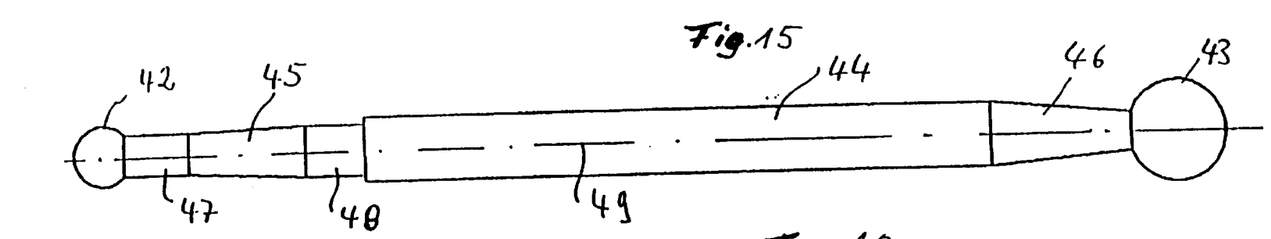
FIG. 15: A practical example of a connecting rod which transfers pedal movements to a power brake unit of the vehicle.
Figure 16:
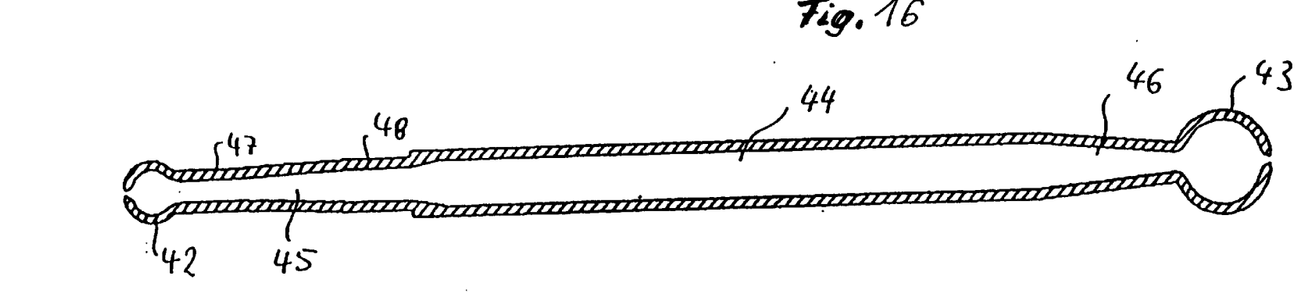
FIG. 16: A sectional view of a practical example of the connecting rod shown in FIG. 15.
Figure 17:
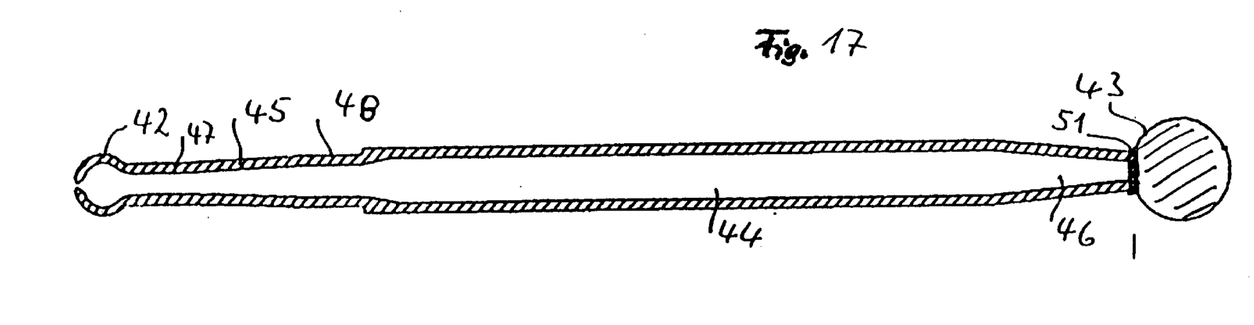
FIG. 17: A sectional diagram of a further practical example of a connecting rod.

In the practical example of FIGS. 12 through 14, the area near the pedal 50 of a vehicle is shown. The pedal lever 14, specifically the brake pedal, is supported on the vehicle structure in such a manner that it can pivot around the pedal spindle 5. A connecting rod, additional practical examples of which are shown in FIGS. 15 through 17, is connected in an articulating manner as a further supporting element 21 to the pedal lever 14. The connecting rod 21 extends in a roughly horizontal direction up to the entrance side of the power brake unit 3, which constitutes a vehicle component. In order to connect the connecting rod 21 to the pedal lever 14 in an articulated manner, the connecting rod 21 has an articulated bearing 43 at one of its ends. In order to connect an actuating component to the power brake unit 3 in an articulated manner, the connecting rod 21 has an additional articulated bearing 42 at its other end. During normal automotive operation, when the brake pedal is pushed, the movement of the pedal is transferred via the pedal lever 14 and the connecting rod 21 to the power brake unit 3 in order to operate the brakes.

In order to prevent injuries to the passengers resulting from the pedal unit 50 being pushed into the interior of the vehicle during an accident, particularly a rear-end collision, the mounting of the pedal lever 14 is detached in such a way that the connecting rod 21 is deformed perpendicular to its longitudinal axis 49. In this case, the support provided for the pedal lever by the connecting rod 21 during normal operation of the vehicle is released, and specifically, the pedal lever 14 is pivoted away from the vehicle passengers. As described above, a point of action 31, which constitutes the connection point between the ends of the articulated support 30 and the strut 39 is used to deform the connecting rod 21. The articulated support 30 has a supporting site 33 on the vehicle structure near a transverse steering tube 41. At its other end, the strut 39 has the supporting site 32 on the pedal frame of the vehicle structure. The ends of the articulated support 30 and the strut 39 facing the connecting rod 21 are connected to each other in an obtuse angle at the point of action 31.

In the event of movement of the front portion of the pedal frame, specifically in the area of the supporting site 32 toward the interior of the vehicle, e.g., during an accident, the point of action 31 is guided in a restricted manner by the strut 39 and the articulated support 30 so that it moves approximately perpendicular to the longitudinal axis 49 of the connecting rod 21, and the connecting rod 21 is deformed, as shown, for example, in FIG. 13.

FIGS. 15 through 17 show practical examples of the connecting rod 21.

The connecting rod according to the practical examples has a deformable rod area 44 which is in the form of a hollow cylinder. There are articulated bearings 42 and 43 at the ends of the connecting rod 21. In the practical example shown in FIG. 15, the articulated bearings 2 and 3 are also hollow. In the practical example shown in FIG. 17, the articulated bearing 42, which is connected to the actuating component of the power brake unit 3, is hollow. At the other end, the articulated bearing consists of a solid sphere. This articulated bearing 43 is connected to the pedal lever 14. The articulated bearing 43 shown in FIG. 17, which is in the form of a solid sphere, is connected via a weld 51 to the other portion of the connecting rod, which has a hollow shape. In the practical example of FIG. 16, the connecting rod has a hollow shape over its entire length.

Between the articulated bearing 42, which is connected to the power brake unit 3, and the end of the deformable rod area 44, there is a rod component 45 in the shape of a hollow truncated cone. The rod component in the shape of a hollow truncated cone 45 is connected via a hollow cylindrical rod component 48 to the hollow cylindrical deformable rod area 44. At the other end, the rod component 45 in the form of a hollow truncated cone is connected via the hollow cylindrical rod component 47 to the articulated bearing 42.

At the other end, the deformable rod area 44 is connected to the articulated bearing 43 via a rod component 46 in the form of a hollow truncated cone.

The hollow cylindrical rod component 48 has a smaller external and internal diameter than the deformable rod area 44. The hollow cylindrical rod component 47 has a smaller external and internal diameter than the hollow cylindrical rod component 48.

The point of action 31, which is moved in FIG. 12 from the top to the bottom approximately perpendicular to the longitudinal axis 49 of the connecting rod 21, acts on the hollow cylindrical deformable rod area 44. Because of the hollow shape, specifically in the case of an accident, if the components of the vehicle located in front of the pedal unit 50 move toward the interior of the vehicle in the event of an accident, one thus achieves a specified deformation of the connecting rod 21, thus moving the pedal lever 14 out of the danger area in which injuries may be caused, particularly to the legs of the passengers.

Because the connecting rod 21 has a hollow shape, one can also achieve a specified reduction in the force applied to the pedal in the event of panic braking. This specified reduction in force is achieved by correspondingly adjusting the wall thickness of the tube shape, particularly in the deformable rod area 44.

Preferably, the tube shape of the connecting rod of the practical examples shown is formed from a tube-shaped blank by shaping forces acting from the outside. A preferable method for this purpose is plastic deformation using a rotary kneading process. The special tube components 44 through 48 and the hollow articulated bearings 42 and 43 may be produced by means of this rotary kneading process.

The external diameter of the connecting rod 21 is approx. 7 mm to 15 mm, and preferably 10 mm. The wall thickness of the connecting rod is approx. 1 to 2 mm, and preferably 1.5 mm. The ratio of wall thickness to external diameter in the deformable rod area 44 of the connecting rod 21 is between 0.06 and 0.3, and preferably 0.15.

What is claimed is:

1. An arrangement for moving a pedal lever away from a passenger in a motor vehicle in response to a collision impact comprising:
    a pedal lever mounted on a vehicle structure via a pedal spindle for pivoting motion about an axis corresponding substantially to that of the pedal spindle;
    a supporting element connecting the pedal lever to a vehicle component in such a manner that the pedal lever can be pivoted around the pedal spindle with a specified actuating force with the supporting element in a supporting position a
    means for deforming the supporting element from its supporting position for the pedal lever so as to produce pivotal motion of the pedal lever substantially about the axis of the pedal spindle in a direction away from a vehicle passenger in response to external forces acting on the vehicle.

2. An arrangement according to claim 1 wherein, in order to deform the supporting element from its supporting position, a movement and/or deformation of the vehicle component due to the external force acting on the vehicle can be transferred to the supporting element.

3. An arrangement according to claim 1 wherein movement of the supporting element out of its supporting position is opposed by a force tending to maintain the supporting element in its supporting position.

4. An arrangement according to claim 1 wherein the vehicle component is located in an engine compartment of the vehicle.

5. An arrangement according to claim 1 wherein the supporting element is moveably guided in its axial direction on the vehicle component.

6. An arrangement according to claim 1 wherein the supporting element is formed in a deformable manner for deformation out of the supporting position.

7. An arrangement according to claim 6 wherein a deforming force is essentially directed perpendicular to the axial direction of the supporting element which is in the form of an actuating rod.

8. An arrangement according to claim 7 wherein, as a result of the deforming force, a deformation component moves perpendicular to the axial direction of the supporting element which is in the form of an actuating rod.

9. An arrangement according to claim 7 wherein the deforming force is the resultant of at least two forces which originate during a movement of the vehicle component.

10. An arrangement according to claim 6 wherein deformation work is derived from relative displacement of the vehicle component and the pedal spindle.

11. An arrangement according to claim 6 wherein an articulated support, which is guided in a restricted manner through movement of a vehicle component and is pivotably supported on the vehicle structure, deforms the supporting element, which is in the form of an actuating rod.

12. An arrangement according to claim 1 wherein the supporting element is an actuating rod arranged between the pedal lever and the vehicle component which transfers operating motion of the pedal to the vehicle component.

13. An arrangement according to claim 12 wherein the supporting element has a tube-shaped cross section in at least in one region.

14. An arrangement according to claim 12 wherein the supporting element essentially has a tube shape over its entire length.

15. An arrangement according to claim 13 wherein the wall thickness of the tube-shaped region of the supporting element is in the range from about 1 mm to about 2.0 mm.

16. An arrangement according to claim 13 wherein the ratio of the wall thickness to the external diameter in the deformable region of the supporting element is between 0.06 and 0.3.

17. An arrangement according to claim 12 wherein, at the end of the supporting element, articulated bearings are provided for articulated support of the supporting element on the vehicle component and on the pedal lever.

18. An arrangement according to claim 17 wherein at least one of the articulated bearings is hollow.

19. An arrangement according to claim 12 wherein the supporting element is at least partially in the form of a hollow cylinder in its deformable region.

20. An arrangement according to claim 12 wherein the supporting element can be deformed perpendicular to its longitudinal axis.

21. An arrangement according to claim 12 wherein the supporting element is in the form of a connecting rod which acts between a brake pedal and a power brake unit of the vehicle.

22. An arrangement according to claim 13 wherein the region of the supporting element which has a tube-shaped cross section is formed from a tube-shaped blank by external shaping forces.

23. An arrangement according to claim 12 wherein the supporting element is formed by rotary kneading.

24. An arrangement for detaching a pedal lever which can be pivoted around a pedal spindle from the structure of a motor vehicle comprising:
    a pedal lever mounted on a vehicle structure via a pedal spindle; and
    a supporting element connected to a vehicle component in such a manner that the pedal lever can be pivoted around the pedal spindle with a specified actuating force with the supporting element in a supporting position, and
    wherein the supporting element is arranged to be moved out of its supporting position in response to external forces acting on the vehicle, and wherein the supporting element is an actuating rod arranged between the pedal lever and the vehicle component which transfers operating motion of the pedal to the vehicle component, and wherein, at the ends of the supporting element, articulated bearings are provided for articulated support of the supporting element on the vehicle component and on the pedal lever, and wherein rod components in the shape of hollow truncated cones are provided between the articulated bearings and the deformable region.

25. An arrangement according to claim 24 wherein the rod component having a hollow truncated cone shape which is closer to the vehicle component has hollow cylindrical rod components at both of its ends and one of the hollow cylindrical rod components is rigidly connected to the articulated bearing which is connected to the vehicle component and the other hollow cylindrical rod component is rigidly connected to the deformable rod area.

26. An arrangement according to claim 25 wherein the hollow cylindrical rod component which is connected to the deformable region has a smaller external and internal diameter than the deformable region and a larger internal and external diameter than the hollow cylindrical rod component which is connected to the articulated bearing.

27. An arrangement according to claim 25 wherein the external diameter of the deformable region is in the range from about 7 mm to about 15 mm.

* * * * *